(12) United States Patent
Chen

(10) Patent No.: US 6,321,807 B1
(45) Date of Patent: Nov. 27, 2001

(54) COMPOSITE TIRE WITH STEEL JACKET

(76) Inventor: Yu-Fu Chen, No. 49, U Twu Ku, Lin 9, Yeong Fu Li, Dah Shi City, Taoyuan (TW)

(*) Notice: Subject to any disclaimer, the term of this patent is extended or adjusted under 35 U.S.C. 154(b) by 0 days.

(21) Appl. No.: 09/553,749

(22) Filed: Apr. 21, 2000

(51) Int. Cl.[7] .............................. B60C 5/00; B60C 19/12
(52) U.S. Cl. ........................................ 152/175; 152/187
(58) Field of Search .......................... 152/176, 188, 152/175, 187

(56) References Cited

U.S. PATENT DOCUMENTS

| | | | | |
|---|---|---|---|---|
| 903,891 | * | 11/1908 | Scheuner | 152/188 |
| 1,289,929 | * | 12/1918 | Schleicher | 152/175 X |
| 1,420,979 | * | 6/1922 | Ehlich | 152/187 |
| 1,555,093 | * | 9/1925 | Wyckoff | 152/187 |
| 1,587,997 | * | 6/1926 | Wyckoff | 152/187 |

\* cited by examiner

Primary Examiner—Adrienne C. Johnstone
(74) Attorney, Agent, or Firm—Rosenberg, Klein & Lee

(57) ABSTRACT

The invention herein relates to a composite tire comprised of a rubber tire mounted over a rim which is covered externally by an assembly of cover tire having the following features: the cover tire is internally lined with a steel jacket that totally removes the risk of puncture; said cover tire is supported by the inflated tire and in contact with ground surface in rubber material that allows its usage by vehicles completely barrier-free; in addition, said cover tire uses significantly less rubber than regular tires and is replaceable anytime after wear without the need to change the entire tire. It not only effectively lowers the consumption of rubber, thus is both economical and environmentally friendly.

1 Claim, 3 Drawing Sheets

COMPOSITE TIRE WITH STEEL JACKET

BACKGROUND OF THE INVENTION

1. Field of the Invention

The invention herein relates to a composite tire comprised of a rubber tire mounted over a rim having externally an assembly of cover tire that protects the tire from puncture and wear. Such composite tire offers greatly driving safety and effectively reduces the consumption of rubber in the production of tire. Thus it is both environmentally friendly, economical, and directly enhances the value of industrial application.

2. Description of the Related Art

The construction of regular tires comes in two styles. The first one, as shown in FIG. 1, is to mount rubber tire 1 on rim 2 and air fills inside tire 1 directly; the second one is to mount a band of rubber over the rim, and then arrange a rubber tube inside for accommodating air. Given the excellent properties of traction, wear-resistance and elasticity of rubber material, the aforesaid tires are arranged in such a way that they are in direct contact with ground surface, and undeniably, provide considerable comfort, speed and safety in driving. But in practical application, such tire construction also have some shortcomings:

1. Rubber cannot fend off sharp objects. Thus tires made of rubber that is either directly inflated or inflated through a rubber tube inside are susceptible to puncture by screws, nails or other hard, sharp objects scattered on the roads where vehicles travel. Punctured tire endangers driving safety, particularly when the car is carrying heavy load or traveling in high speed that it may flip over due to instantaneous deflation of tire.

2. Regular tire, be it inflated directly or through a rubber tube, is made of rubber and steel wires. When its treads are worn to a certain extent, the entire tire must be scrapped without the possibility of retreading. The remaining rubber cannot be re-utilized either. Moreover, to give tire surface certain thickness and strength, treads cannot be made too deep to begin with, which tends to necessitate tire change more frequently.

3. Rubber is not prone to decay. Its recycling and re-processing are complicated, tedious and costly. Thus the majority of used tires are not recycled, but scrapped. They are often randomly discarded and left unattended that produces an adverse impact on the environment. The pool of standing water in the inner trough of tire provides ground for propagation of disease vectors.

Thus the construction of regular tires has some shortcomings that can be improved in practical application.

SUMMARY OF THE INVENTION

The objective of the invention herein is to provide a composite tire, wherein rubber tire mounted over a rim is arranged externally with a cover tire assembly; the cover tire is lined internally with a steel jacket and the use of such tire can remove completely the risk of puncture or total wear.

Another object of the invention herein is to provide a composite tire, wherein the cover tire is supported by the inflated tire after the assembly is mounted over the tire and in contact with the ground surface in rubber material that allows its usage by vehicles completely barrier-free (providing elasticity and traction). More so, when treads in contact with the ground surface are worn out, it is only necessary to replace the cover tire without changing the entire tire, making the use of tire more economical.

Furthermore, the invention herein aims to provide a composite tire wherein the lining of steel jacket inside the cover tire protects the tire surface from puncture and air leak. Such arrangement allows treads on the outer circumference of tire to be deeper and fully utilized, and naturally prolongs the service life of tire.

Another objective of the invention herein is to provide a composite tire wherein rubber on the surface of the cover tire is more fully utilized and easily scraped off after it is worn out that allows the steel jacket to be recycled and effectively reduces the use of rubber material, making the tire both environmentally friendly and economical. It is an improvement over tires of prior art where tires are randomly disposed that causes pollution to the environment and is prone to the propagation of vectors.

DETAILED DESCRIPTION OF THE PREFERRED EMBODIMENT

Figure 1:
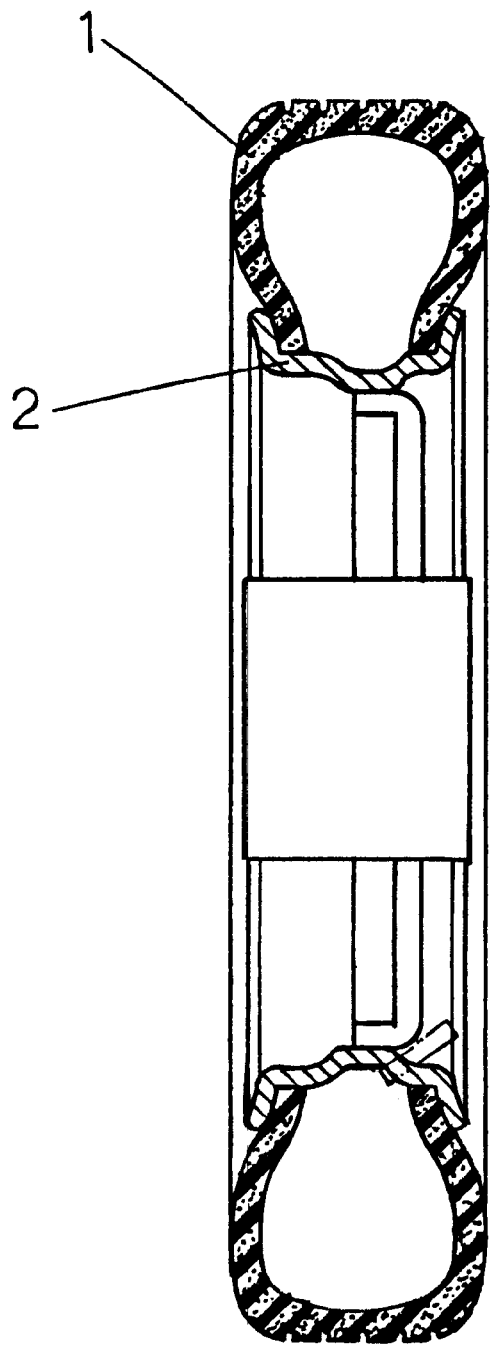
FIG. 1 is a cross-sectional drawing of a conventional tire mounted on steel rim.
Figure 2:
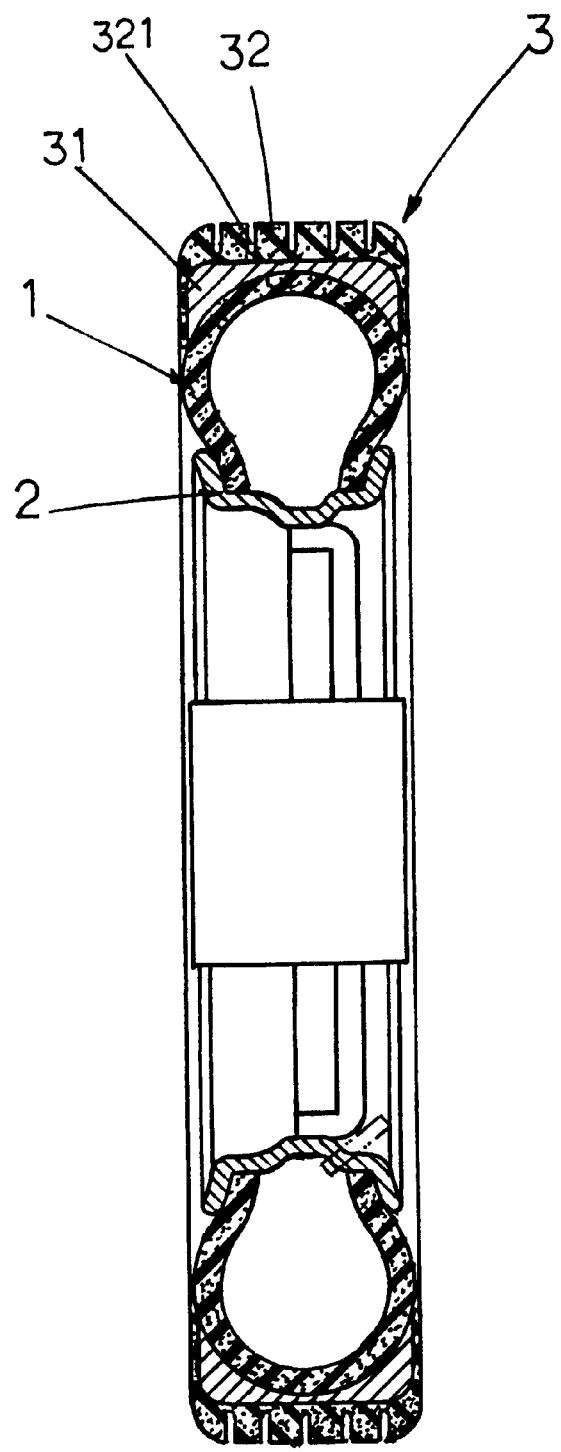
FIG. 2 is a cross-sectional drawing of the preferred embodiment of the invention herein.
Figure 3:
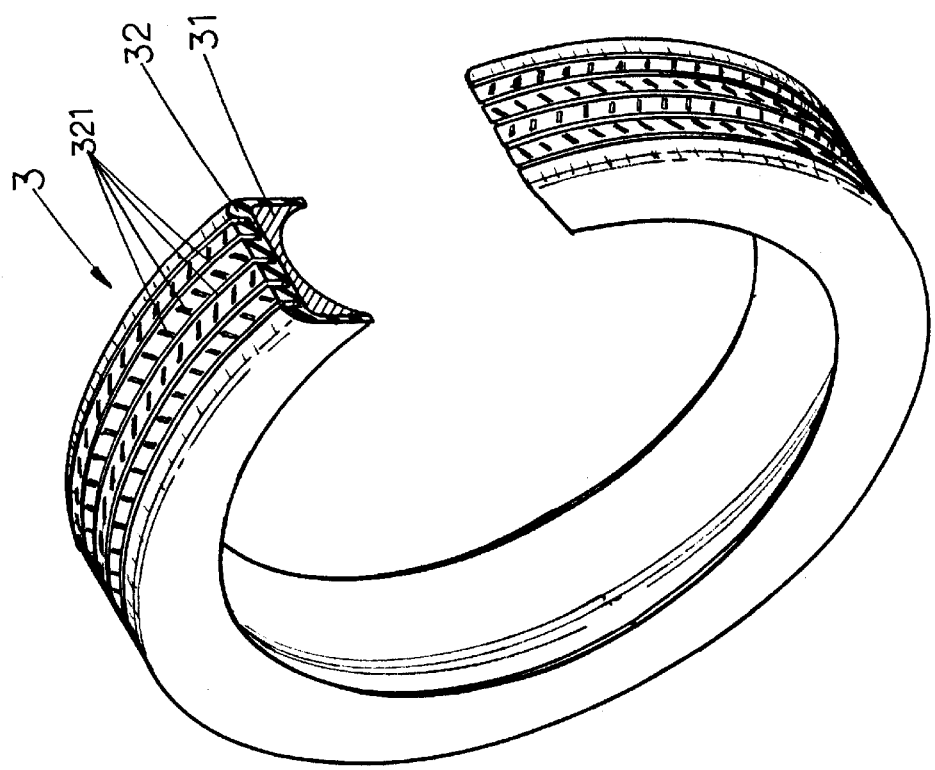
FIG. 3 is a three-dimensional drawing of the preferred embodiment of the invention herein.

Referring to FIG. 2, and FIG. 3, the preferred embodiment of the invention herein is a composite tire consisting primarily of a tire 1 mounted on rim 2 having an assembly of cover tire 3 arranged on the outside. Said cover tire 3 has an inner lining of steel jacket 31, whereas the outer circumference of said steel jacket 31 is covered with a layer of rubber ply 32. The inner lining of steel jacket 31 is configured according to the construction of tire 1 and slightly smaller, so that when tire 1 is in non-rigid, deflated state, the steel jacket 31 can be fitted easily over the surface of tire with the aid of a tool, and when tire 1 is filled with air, it braces fire 1 sturdily by the action of tension of inflated tire 1. In addition, the rubber ply 32 over the circumference of cover tire is arranged with anti-skid treads 321; the depth of said treads can be in close proximity to steel jacket 31.

When tire 1 mounted over rim 2 is not inflated, it is non-rigid and flexible. Thus steel jacket 31 that provides inner lining of cover tire 3 can be easily fitted over it with the aid of a tool. Given that the inner circumference of steel jacket 31 is configured based on the shape of tire 1 and slightly smaller. When tire 1 is inflated, its external force of tension will push steel jacket 31, so that the entire cover tire 31 braces tire 1 snugly and solidly.

As described above, after cover tire 3 of the invention herein is arranged over tire 1, its inner lining of steel jacket 31 can fend off sharp objects such as nails that provides a shield for inflated tire 1. As such, the surface of tire 1 can always stay free of puncture by sharp objects on the road that causes air leak. In addition, the outer surface of cover tire 1 is arranged with rubber ply 32 that is in contact with ground surface and have anti-skid treads 321. The inner lining of steel jacket 31 is directly supported by inflated tire 1. Thus when the composite tire is used on vehicles, it not only prevents tire from being punctured or worn, it also provides the features of shock absorbency, anti-skid and traction. So with steel jacket 31 that lines the cover tire 3 offering protection to tire 1 against puncture or wear, and treads 321 of rubber ply 32 being deeper that allows the entire rubber ply better utilized, tire 1 can have longer service life. In addition, cover tire 3 can be removed and replaced after rubber ply 32 is worn out without changing tire 1. It saves the use of rubber in comparison with the need to replace the entire tire in prior arts. Thus such design is both environmentally friendly and economical. Moreover, the remaining rubber on rubber ply 32 can be scraped off easily that allows the reutilization of steel jacket 31. Since rubber ply 32 of worn cover tire 3 can be scraped off and its inner lining of steel jacket can be recycled, the whole process is much easier and more practical than the recycling or disposal of conventional scrapped tires. It is also an immediate improvement over conventional tire where the often randomly discarded and piled up tires are prone to foster the growth of disease vectors.

As described above, the configuration and size of tire 1 are set freely according to the needs of practical application.

The important thing is to make sure cover tire 3 must be fitted snugly over it so the composite tire comes in an integral piece.

What is claimed is:

1. A composite tire comprised of a rubber tire mounted over a rim having an assembly of cover tire arranged on the outside, wherein the inner circumference of said cover tire is lined with a steel jacket which is configured based on the construction of the rubber tire and is slightly smaller; a rubber ply is arranged on the outer surface of the steel jacket and the circumferential surface of said rubber ply is arranged with treads with depth in proximity to the steel jacket.

* * * * *